United States Patent Office 3,210,301
Patented Oct. 5, 1965

3,210,301
PROCESS OF RUBBER WHEREIN ATACTIC POLYPROPYLENE IS ADDED
Roy A. White, Somers, Conn., assignor, by mesne assignments, to Socony Mobil Oil Company, Inc., New York, N.Y., a corporation of New York
No Drawing. Filed Nov. 13, 1962, Ser. No. 237,291
2 Claims. (Cl. 260—4)

This invention relates to the processing of reclaimed rubber. It is more particularly concerned with an improved tackifier for processing reclaimed rubber.

As is well known to those familiar with the art, reclaimed rubber is rather extensively used in rubber compounding. Vulcanized scrap rubber, such as from tires, tubes, boots, and shoes, is first subjected to a reclaiming operation to remove fibers and the like. After scrap rubber has undergone a reclaiming operation, but before the reclaimed rubber can be used in rubber compounding, it must be made cohesive, plastic, workable, and formable. This is accomplished by operations involving intensive working, such as, for example, on a rubber mill, an extruder, a Banbury mixer, or a plasticator. Reclaimed rubber itself, without tackifiers or plasticizers, requires prolonged working before it is utilizable for rubber compounding. Such extended working is uneconomical, because of the processing time involved.

In order to reduce the time of working reclaimed rubber, it has been proposed to add processing aids, i.e., plasticizers and tackifiers. Typical processing aids proposed include rosins, coumarone-indene resins, terpene resins, and some petroleum resins of rather indefinite composition. Polyisobutylene has been a preferred proposed processing aid.

It has now been discovered that the working time for reclaimed rubber can be economically reduced. It has been discovered that the inclusion of atactic polypropylene greatly reduces the working time for homogenizing reclaimed rubber.

Accordingly, it is a broad object of this invention to provide an improved intensive working operation for reclaimed rubber. Another object is to decrease the working time for rubber reclaiming. A specific object is to provide an improved tackifier for rubber reclaiming. Another specific object is to provide an improved process for compounding reclaimed rubber. Other objects and advantages of this invention will become apparent to those skilled in the art, from the following detailed description.

The present invention provides, in the process of intensive working of reclaimed rubber, the improvement that comprises adding to said reclaimed rubber between about 0.1 phr. and about 35 phr. atactic polypropylene.

The atactic polypropylene that is added to the reclaimed rubber during intensive working, in accordance with this invention, is a solid, non-crystalline linear polymer of propylene. In structure, it is characterized by having methyl groups attached to the main polymer chain, which are randomly located above and below the plane of the main polymer chain. Atactic polypropylene can have a molecular weight of from about 5,000 to about 35,000 or more. It has been prepared with molecular weight in the order of 800,000–1,000,000. Preferably, the atactic polypropylene will have a molecular weight lower than about 10,000. It can be prepared by several catalytic methods well known in the art and is commercially available.

The amount of atactic polypropylene that is required to facilitate working of reclaimed rubber is relatively small. In general, between about 0.1 phr. and about 35 phr. atactic polypropylene is used. In preferred practice, between about 0.5 phr. and about 10 phr. is employed.

As mentioned hereinbefore, scrap rubber is subjected to a reclaiming operation. Then, the reclaimed rubber is subjected to finishing operations. The unfinished coarse particles or crumbs of reclaimed rubber are usually given a preliminary blending or mixing with additives in a ribbon blender. Typical additives are oils, tackifiers, and fillers. Atactic polypropylene can be added at this stage, in accordance with this invention. The mixture of reclaimed rubber is then intensively worked. Finally the material is passed through a refiner, a 2-roll mixer having close clearance between the rolls. The first refiner pass is usually at a clearance of about 0.01 inch and the subsequent passes at a clearance of 0.002–0.005 inch.

In the following examples, in order to provide a uniform basis for comparing reclaimed rubber mixes and their relative ease in working, a standard procedure was adopted: Each mix was passed 30 times through a differential-speed 2-roll mill without banding, by catching and removing the sheet as it came through the nip. The rolls were set 0.01–0.20 inch apart. After 30 passes through this mill, the material was passed through a second mill with rolls set 0.01 inch apart, until banding was effected. The number of passes required to effect banding on the second mill afforded a basis for comparing the mixes and the relative efficiency of the processing aid. The more efficient processing aid produced a mix that banded after the fewest number of passes in the second mill.

Example 1

Unfinished reclaimed rubber was mixed with 3%, by weight, atactic polypropylene. The atactic polypropylene had a Ring and Ball Softening Point of 75° C., a density of 0.79, and a molecular weight of about 6,000. The mixture was processed on the first rubber mill for 30 passes through the mill without banding. Then the mixture was transferred to the second mill and banding was attempted. Banding was effected, in several runs, on the first or second pass.

Example 2

Unfinished reclaimed rubber was mixed with 3 phr. polyisobutylene and processed on the first rubber mill for 30 passes without banding. In attempting to band this mixture on the second mill, it required 5 to 7 passes.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:
1. In the process of reclaiming rubber from which fibrous matter has been removed including the step of intensive mechanical working of reclaimed rubber to make it cohesive, plastic, workable, and formable, the improvement that comprises adding to said reclaimed rubber dur- ing said working between about 0.1 part per hundred parts rubber and about 35 parts per hundred parts rubber of atactic polypropylene, whereby the working time for homogenizing the reclaimed rubber is reduced.

2. In the process of reclaiming rubber from which fibrous matter has been removed including the step of intensive mechanical working of reclaimed rubber to make it cohesive, plastic, workable, and formable, the improvement that comprises adding to said reclaimed rubber during said working between about 0.5 part per hundred parts rubber and about 10 parts per hundred parts rubber of atactic polypropylene having a molecular weight between about 5,000 and about 10,000, whereby the working time for homogenizing the reclaimed rubber is reduced.

References Cited by the Examiner

UNITED STATES PATENTS

| 3,024,211 | 3/62 | Daly | 260—4 |
| 3,037,954 | 6/62 | Gessler | 260—4 |
| 3,042,634 | 7/64 | Mankowich et al. | 260—4 |

FOREIGN PATENTS 225,161   11/59   Australia.

MURRAY TILLMAN, *Primary Examiner.*
LEON J. BERCOVITZ, *Examiner.*